United States Patent
Rose

(10) Patent No.: US 12,454,022 B2
(45) Date of Patent: Oct. 28, 2025

(54) DEVICE FOR THERMALLY JOINING AT LEAST ONE WORKPIECE, COMPRISING A TORCH AND AN EXTRACTION UNIT

(71) Applicant: Alexander Binzel Schweisstechnik GmbH & Co. KG, Buseck (DE)

(72) Inventor: Sascha Rose, Fernwald (DE)

(73) Assignee: Alexander Binzel Schweisstechnik GmbH & Co., KG, Buseck (DE)

( * ) Notice: Subject to any disclaimer, the term of this patent is extended or adjusted under 35 U.S.C. 154(b) by 865 days.

(21) Appl. No.: 17/617,203

(22) PCT Filed: Jul. 7, 2020

(86) PCT No.: PCT/EP2020/069120
§ 371 (c)(1),
(2) Date: Dec. 7, 2021

(87) PCT Pub. No.: WO2021/008944
PCT Pub. Date: Jan. 21, 2021

(65) Prior Publication Data
US 2022/0241885 A1    Aug. 4, 2022

(30) Foreign Application Priority Data
Jul. 17, 2019  (DE) .......................... 102019119341.9

(51) Int. Cl.
*B23K 9/32*     (2006.01)
*B08B 15/00*   (2006.01)
(Continued)

(52) U.S. Cl.
CPC ............ *B23K 9/325* (2013.01); *B08B 15/007* (2013.01); *B23K 9/0956* (2013.01); *B23K 37/00* (2013.01)

(58) Field of Classification Search
CPC ...... B23K 9/325; B23K 9/0956; B23K 37/00; B23K 9/32; B23K 3/08; B08B 15/007; B08B 15/04
See application file for complete search history.

(56) References Cited

U.S. PATENT DOCUMENTS 3,909,585 A * 9/1975 Sanders ................. B23K 9/291
                                                          138/120
5,036,754 A * 8/1991 Simms .................... B08B 15/00
                                                          454/65

(Continued)

FOREIGN PATENT DOCUMENTS

DE      4007147 A1    9/1991
DE      4225014 A1    2/1994
(Continued)

*Primary Examiner* — Tiffany T Tran
(74) *Attorney, Agent, or Firm* — Rogowski Law LLC

(57) ABSTRACT

A device (10) for thermally joining workpieces has a torch (1) and an extraction unit (2) for extracting fumes that are produced during welding, cutting or soldering processes. At least one sensor (3) determines the position and/or position changes of the torch (1) and/or a reference point in the area relative to a reference position of the torch (1) and/or of the workpiece that is to be processed. Volume flow of extracted fumes at the extraction unit (2) acting at the torch (1) is adjusted as a function of the determined position and/or position change of the torch (1).

14 Claims, 9 Drawing Sheets

(51) Int. Cl.
*B23K 9/095* (2006.01)
*B23K 37/00* (2006.01)

(56) References Cited

U.S. PATENT DOCUMENTS

| | | | |
|---|---|---|---|
| 9,519,203 B1 | 12/2016 | Kennair, Jr. | |
| 2006/0078369 A1* | 4/2006 | Spratte | F16C 11/0609 403/122 |
| 2007/0187378 A1* | 8/2007 | Karakas | B23K 9/1087 219/130.21 |
| 2009/0321403 A1* | 12/2009 | Brenneke | B23K 37/006 219/137.41 |
| 2012/0111845 A1* | 5/2012 | Simms | B08B 15/002 219/137 R |
| 2013/0244560 A1* | 9/2013 | Hammers | B08B 15/002 454/63 |
| 2020/0198042 A1* | 6/2020 | Imamachi | B23K 9/095 |

FOREIGN PATENT DOCUMENTS

| | | |
|---|---|---|
| DE | 20200901848 U1 | 11/2011 |
| EP | 2292367 A1 | 3/2011 |
| EP | 2556913 A1 | 2/2013 |
| EP | 2556914 A1 | 2/2013 |
| WO | 2006042572 A1 | 4/2006 |
| WO | 2013166247 A1 | 11/2013 |
| WO | 2016060721 A1 | 4/2016 |

\* cited by examiner

DEVICE FOR THERMALLY JOINING AT LEAST ONE WORKPIECE, COMPRISING A TORCH AND AN EXTRACTION UNIT

CROSS-REFERENCE TO RELATED APPLICATIONS

This application is a national stage application (under 35 USC § 371) of PCT/EP2020/069120, filed Jul. 7, 2020, which claims benefit of German application No. 10 2019 119 341.9, filed Jul. 17, 2019, the contents of each of which are incorporated by reference herein.

BACKGROUND OF THE INVENTION

Technical Field and State of the Art

The invention relates to a device for thermally joining at least one workpiece, comprising a torch and an extraction unit for extracting fumes that are produced during welding, cutting or soldering processes.

Thermal joining methods utilize energy to melt the workpieces and join them. "MIG", "MAG" and "TIG" welding, plasma torches, e-manual torches with their hybrid methods as well as laser methods are standard techniques that are employed in sheet metal processing. Cutting torches on the basis of plasma and lasers are also the objective of the invention.

When it comes to shielding gas-assisted arc welding methods employing a consumable electrode (MSG), "MIG" stands for "metal inert gas" and "MAG" stands for "metal active gas". In the case of shielding gas-assisted arc welding methods employing a non-consumable electrode (TSG), "TIG" stands for "tungsten inert gas". The devices according to the invention can be configured as machine-controlled welding torches that are arranged on a robot arm. However, manual or automated torches are also conceivable.

In general, arc welding devices generate an arc between the workpiece and a consumable or a non-consumable welding electrode in order to melt the material that is to be welded. A stream of shielding gas shields the material that is to be welded as well as the welding site against the atmospheric gases.

In this context, the welding electrode is provided on a torch body of a welding torch that is connected to an arc welding device. The torch body normally has a group of internal components that carry welding current and that conduct the welding current from a source of welding current in the arc welding device via the tip of the torch head to the welding electrode, where it then generates the arc to the workpiece.

The shielding gas stream flows around the welding electrode, the arc, the welding bath and the heat-affected zone on the workpiece, and in this process, it is fed to these areas via the body of the welding torch. A gas nozzle conveys the shielding gas stream to the front end of the torch head, where the shielding gas stream exits from the torch head around the welding electrode in an approximately annular pattern.

During the welding procedure, the arc generated for the welding heats up the workpiece that is to be welded as well as any optionally added welding material, so that these are melted.

Aside from welding, soldering is also an option when it comes to joining sheet metal components. Unlike in the case of welding, with soldering, it is not the workpiece that is melted but rather only the filler material. The reason is that, in soldering, two edges are joined together by the solder as the filler material. The melting temperatures of the solder material and of the component materials are very different, which is why only the solder melts during processing. Aside from TIG, plasma and MIG torches as well as lasers are likewise suitable for soldering.

The arc soldering processes can be broken down into metal shielding gas soldering (MSG-S) processes and tungsten-shielding gas soldering (TSG-S) processes. For the most part, copper-based materials in wire form whose melting ranges are lower than those of the base materials are used here as the filler materials. In terms of the equipment employed, the principle of MSG arc soldering is largely identical to MSG welding, using filler material in wire form.

Soldering or welding such as, for example, electric arc welding of metals, gives rise to more or less large amounts of exhaust gases or fumes—some of which are harmful to health—depending on the composition and the contamination of the materials that are to be welded or soldered; these gases or fumes might not only impair the view of the welding or soldering site, but might also cause harm to the health of the user of the welding or soldering device since they irritate the eyes and the respiratory system. Consequently, in actual practice, various devices and methods have been developed that permit an extraction of the exhaust gases as close as possible to the place where they are generated at the torch.

The most frequently employed extraction units for welding fume extraction torches cannot be regulated at all or only at the extraction device itself. An alternative regulation of the extraction motor power by the welder is described in European patent specification EP 2 556 914 B1. Here, the rotational speed of the motor is supposed to be varied manually by actively using a remote control on the handheld welding torch.

For the most part, nowadays, manual welding fume extraction torches are fitted with mechanical sliding controllers with which the welder can divert a portion of the volume flow in the area of the torch handle. In this manner, the volume flow in the vicinity of the process is reduced. As a rule, this is done by means of a slide on the opening at the top of the welding torch handle that can be slid with the thumb or else this is done by means of a radial opening fixture situated between the torch handle and the torch neck as is described in European patent specification EP 2 556 913 B1.

So far, no specific volume flow control capabilities are known for robot welding fume extraction torches.

A position-dependent regulation of welding parameters is known from PCT international patent application WO 2006/042572 A1 and from PCT international patent application WO 2016/060721 A1.

PCT international patent application WO 2006/042572 A1 describes a sensor means for detecting the position and/or the changes in the position of the torch, as a result of which at least one characteristic variable of the joining, cutting or surface-treatment process, especially of the welding process, can be influenced as a function of the detected position and/or of the changes in the position.

PCT international patent application WO 2006/042572 A1 also relates to conventional arc welding processes and torches that do not have an extraction capability.

German utility model DE 20 2009 018 481 U1 discloses process-dependent settings for the extraction—for one thing, synchronized ON-OFF switching, but also process-dependent and parameter-dependent settings. According to German utility model DE 20 2009 018 481 U1, it is provided for the welding device and the extraction unit to be coupled on a process-dependent basis. The terms process and parameters can especially refer to the strength of the current, but also to the welding processes, especially short arc, pulsed arc, transition arc and spray arc.

German patent application DE 40 07 147 A1 likewise describes synchronized ON-OFF switching. The intent is to achieve a constant volume flow, even when the extent of clogging in the filter varies or if the pressure drops. For this purpose, secondary air is fed in, additional throttles are actuated or the drive of the extraction unit is regulated.

PCT international patent application WO 2016/060721 A1 describes a motion-dependent configuration of the welding process, but is concretely aimed only at regulating the source of welding current. Extraction torches are neither mentioned nor shown.

PCT international patent application WO 2013/166247 A1 discloses systems and methods for automatically regulating the fume streams that are extracted by a welding fume gun. The device has a vacuum system that is configured to extract a vacuum fume stream through an internal conduit of a welding fume gun. Moreover, a sensor is provided for measuring the vacuum fume stream. Furthermore, bypass solutions on the basis of pressure differential measurements are known.

German patent application DE 422 50 14 A1 discloses an extraction device for welding or cutting systems and it has a torch and a vacuum generator for extracting fume. An extraction nozzle is attached to the torch or to a torch holder, wherein the vacuum generator that is connected to the extraction nozzle generates a particularly variable and/or predefinable high vacuum. Moreover, solenoid valves for feeding in ambient air which are regulated by a computer are also described.

Depending on the application, it can be necessary for a welder who is operating the welding device to change the position of the torch during the welding process relative to the workpieces that are to be welded. Here, it could be desirable or necessary to adjust certain values of the welding method to the specific position of the torch.

The setting that is chosen for of the extraction volume flow in torches, especially in the case of fume extraction torches, constitutes a compromise between the maximum capture of the welding fumes and a minimum impact on the shielding gas coverage.

Most of the time, welding processes are carried out in the direction of the gravitational force. Due to the buoyancy of the hot fumes, they rise, even if no extraction is actively taking place. For this reason, the requisite extraction capacity is less than in the case of a torch held at an angle or if welding is being carried out overhead.

A drawback of using sliding controllers known from the state of the art is that the total volume flow and thus the energy demand remain constant. This drawback affects especially fully automated welding operations employing robots in which the energy demand is especially relevant due to the prolonged times during which they stay switched on.

A manual setting of the extraction volume flow on the extraction device cannot be implemented in actual practice since, as a rule, welding is carried out in varying positions without interruption. It is not practical for regulation by means of a sliding controller to be implemented in robot torches.

Before the backdrop of the above-mentioned drawbacks, the invention has the objective of further improving a device with a torch and an extraction unit in such a manner that harmful fumes are extracted during welding, cutting or soldering processes and in that the processes are further optimized in terms of their execution as well as in terms of energy consumption.

SUMMARY OF THE INVENTION

The invention relates to a device for thermally joining workpieces, comprising a torch and an extraction unit for extracting fumes that are produced during welding, cutting or soldering processes.

According to the invention, at least one sensor means is provided for determining the position and/or the changes in the position of the torch and/or of a reference point in space relative to a reference position of the torch and/or of the workpiece that is to be processed, in such a way that the volume flow of the extraction unit acting at the torch can be influenced as a function of the determined position and/or of the change in the position of the torch.

The basic idea of the teaching according to the invention lies in using sensor means to determine the position of the torch and/or the changes in the position of the torch relative to a reference position of the torch and/or to a reference point in space and/or relative to the workpieces that are to be welded. In this manner, the volume flow of the extraction unit can be influenced as a function of the determined position and/or of the change in the position of the torch.

For this reason, for example, the operation of a device configured as a welding device is considerably simplified and the quality of the welded connections such as, for instance, welded points or welded seams created by means of the device according to the invention can be greatly improved. Moreover, the fumes are removed safely and effectively.

In particular, according to the invention, the volume flow of the extraction unit can also be influenced automatically in terms of its values. For example, control means can be provided that ascertain the position of the torch or the changes in the position of the torch on the basis of output signals of the sensor means, preferably also in three-dimensional space, and that influence the volume flow of the extraction unit in terms of its values as a function of the ascertained position or of the change in the position. In this manner, the operation of the device according to the invention is optimized in terms of energy consumption and the quality of a welded connection is greatly improved.

The sensor means provided according to the invention can detect the position and/or the changes in the position of the torch relative to a reference position and/or to a reference point in space as a function of the specific requirements, wherein the changes in position can be translatory as well as rotatory changes in position and also combinations of translatory and rotatory changes in position.

In this process, changes in the position of the torch can be detected during the procedure on one and the same workpiece. It is also possible to detect changes in position in which a different workpiece is being processed after a change in position. For example, if a welding device is carrying out a welding task that relates to a first workpiece, then for example, a changeover to another workpiece can be detected by the sensor means according to the invention and the value of the volume flow can then be adjusted to the welding task that is to be carried out on this workpiece.

However, an automatic adjustment of the volume flow of the extraction unit can also be provided on the basis of the output signals of the sensor means after a change in the position of a new workpiece. This is conceivable, for instance, when different workpieces that are physically separated from each other are to be processed in a predetermined sequence.

The device according to the invention is especially well-suited for carrying out different welding processes, for example, beam welding processes, autogenous welding processes or arc welding processes, especially a shielding gas-arc welding process.

In this manner, an optimal volume flow is always extracted that does not have a negative effect on the welding process, especially on the shielding gas atmosphere, but that allows the best possible detection.

Another advantage lies in an optimized efficiency of the device thanks to the actively regulated extraction capacity of the extraction device.

When it comes to the manual realm of welding processes, is it also advantageous that the welder is freed from having to make manual readjustments by means of the sliding controller, and moreover, the drawbacks regarding the unnecessary energy consumption are avoided, thanks to the unchanged total extraction capacity. Of course, this also applies to fully automated applications.

The automatic regulation of the extraction volume flow during welding alleviates the work of the welder since the fumes are optimally detected and energy is saved, thanks to the as-needed extraction capacity.

In the automated realm, the advantage lies particularly in the robust shielding gas coverage in spite of the fume extraction since it can be ensured that the risk of extraction of shielding gas is diminished, while at the same time, energy is saved.

According to a first advantageous refinement of the invention, a control or regulation means that is connected to the at least one sensor means is provided in order to automatically control or regulate the volume flow of the extraction unit on the torch as a function of the position and/or of the change in the position of the torch that has been determined by the at least one sensor means. Owing to the automatic regulation of the volume flow, the operation of the device according to the invention is configured especially simply and the quality of the welded connection is further improved.

According to a refinement of the invention, it is provided for the sensor means to have at least one sensor for determining a rotation position and/or for determining the rotatory changes in the position and/or for determining the translatory change in the position of the torch. In this embodiment, the sensor can determine whether the torch is making a translatory movement, for example, when a weld seam is being created. Any suitable sensors or sensor arrays can be used to determine translatory changes in the position of the torch.

For example, an ultrasonic transmitter can be arranged on the torch and it emits ultrasonic waves that are received by a stationary ultrasonic receiver. The travel time of the ultrasonic waves from the ultrasonic transmitter and thus from the torch to the ultrasonic receiver can then be used to determine the distance between the torch and the ultrasonic transmitter. In a corresponding manner, the ultrasonic waves can be received by two ultrasonic receivers that are arranged physically at a distance from each other so that translatory changes in the position of the torch can be determined on the basis of the change in the distance between the torch and each of the two ultrasonic receivers. In order to unambiguously detect changes in the position of the torch in three-dimensional space, three ultrasonic receivers that are arranged physically at a distance from each other can be provided in a corresponding manner, so that the position or the changes in the position of the torch in three-dimensional space can be unambiguously detected on the basis of the appertaining distance of the torch from each of the ultrasonic receivers.

Particularly translatory changes in position can also be detected, for instance, by means of optical sensors. The distance of the torch from a reference point can be determined, for example, by means of a laser interferometer. In a corresponding manner, translatory changes in the position of the torch can be detected by means of two laser interferometers that are independent of each other, and changes in the position of the torch in three-dimensional space can be detected by means of three laser interferometers that are independent of each other.

In another advantageous embodiment of the invention, it is provided for the sensor to determine the speed and/or the acceleration of a translatory and/or rotatory movement of the torch. In this manner, the volume flow of the extraction unit can be influenced even further. For example, in the case of a welding device, the amplitude of the welding current can be influenced as a function of the speed at which the torch moves over the workpieces that are to be welded together during the creation of a welded connection. In order to determine the acceleration of the torch, for example, sensors can be used of the type sold under the designations MMA 6260 Q, MMA 6261 Q, MMA 6262 Q and MMA 6263 Q made by Freescale Semiconductor, Inc., Alma School Road Chandler, Arizona, USA (www.freescale.com) or as a 6-axial motion sensor module 6D-BS, each with 3-axial rotational speed and acceleration sensors on a chip made by the ELV Company.

According to another advantageous embodiment of the invention, it is provided that, during the work procedure, the torch can be guided by hand or by a handling means, especially by a welding robot.

Another embodiment of the invention provides that the reference position of the torch and/or the reference point in space can be selected by the operator, for example, a welder, and/or by the control and/or regulation means. In this embodiment, it is especially possible to adjust the reference position to the circumstances of the specific welding task or to the welder who is using the welding device.

In a refinement of the invention, it is provided that—depending on the selected reference point and/or on the position determined by the sensor means and/or on the change in the position of the torch—the control and/or regulation means determines the extraction capacity as a function of a characteristic map that comprises emission-relevant process characteristic variables that are present as process parameters in the welding current source, especially the current strength, preferably the effective and/or the peak current strength, the welding output and/or the welding speed as well as the wire diameter or the electrode diameter, the filler material and the shielding gas. Therefore, in this embodiment—in accordance with the position information—the volume flow of the extraction unit can be associated with additional emission-relevant process characteristic variables on the basis of a characteristic line or of a multi-dimensional characteristic map.

Thus, in general, the quantity of welding fumes being generated rises as the mean current strength or the consumable quantity rises. The same applies to the admixture of active gas components that likewise increase the emissions. In the case of pulsed welding processes, however, local emission minima are formed due to the pulse frequency as well as the pulse current strength.

For example, when sheet metal of a certain thickness is welded, one set of values of the characteristic variables can be associated with the welding in a certain position such as an upward position, an overhead position or a downward position. However, it is also possible to associate values with the characteristic variables of the welding process as a function of a characteristic line map. Thus, for example, values as a function of the material and/or the thickness of the workpieces that are to be welded together can be associated with characteristic variables.

According to the invention, it is sufficient for the sensor means to determine the position and/or the changes in the position of the torch along an axis, that is to say, one-dimensionally, or in a plane, that is to say, two-dimensionally. However, it can also be provided that the sensor means detect the spatial position and/or the spatial changes in the position of the torch in three-dimensional space. In this embodiment, the position or the change in the position of the torch can be detected particularly accurately so that a wide array of possibilities arise when it comes to influencing the volume flow of the extraction unit.

Another refinement of the teaching according to the invention provides that the volume flow of the extraction unit continuously increases as the angle of incidence or the angle of inclination of the torch increase. Here, the regulation can be implemented employing manual as well as partially automated or fully automated torch guidance. The angle of incidence results here from the forward or backward angle of inclination of the torch in or counter to the advancing direction as well as from the lateral angle of inclination orthogonally to the advancing direction.

According to the invention, however, it is also possible for the volume flow to take place at the extraction nozzle by varying at least one bypass opening for the gas flow at the torch or at the extraction hose on the torch side or at the extraction hose on the extraction device side or at the connection housing or at the extraction unit or by varying one or more apertures at the torch or at the extraction hose on the torch side or at the extraction hose on the extraction device side or at the connection housing or at the extraction unit.

The basis of the design is a function of the effective extraction capacity at the extraction nozzle of the welding fume extraction torch by one of the following measures: an adjustment of the extraction capacity of the extraction device and/or a variation of one or more bypass openings for the gas flow at the extraction hose or at the connection piece on the machine side and/or a variation of one of more apertures in the flow channel or at the extraction nozzle in order to influence the pressure drop in the flow channel, preferably at the transition piece.

According to another embodiment of the invention, the sensor means are arranged in, preferably integrated into, the torch or in the connection leading to the extraction hose on the torch side.

According to the invention, it is also possible for the sensor means to be configured as at least an electronically, inductively, capacitively, optically and/or mechanically functioning sensor, especially as an inclination sensor and/or as an acceleration sensor and/or as a gyrosensor.

The sensor can be integrated into the torch, into the connection to the hose pack or into the hose pack near the torch. In particular, digital electric sensors such as gyrosensors can be supplied in the area of the handle of the torch via already existing electric connections. Through the automatic adjustment of the extraction capacity on the basis of an inclination sensor, a simple control is possible without the need for complicated synchronization of welding programs from an SPS or from a robot, both in manual as well as in automated applications.

As mentioned, the at least one sensor means can be arranged on the handle of the torch and can be fed via electric connections for the power supply of the torch. It is also conceivable for the sensor means to be supplied with electric power by a battery, by an accumulator or by solar cells.

Another refinement of the teaching according to the invention provides for the sensor means to be secured to the welder's hand, to a mechanical torch guide or to an ON-OFF switch or to the arm of the robot. The ON-OFF switch can be situated between the torch and the robot.

According to another embodiment of the invention, it is provided for the control signal for the inclination of the torch to be derived from robot orientation information or from orientation information from welding devices, especially from orbital welding devices of the torch head, so as to thus automatically adjust the volume flow of the extraction unit or the extraction capacity at the extraction nozzle.

According to a refinement of the invention, it is provided for the signal transmission between the sensor and the control of the extraction capacity to take place via cables or wirelessly by means of radio or optical signals.

According to another advantageous embodiment of the invention, the torch and the extraction hose on the torch side are operatively connected via an articulation, for example, a ball-and-socket joint, wherein the sensor means are arranged in the vicinity of the ball-and-socket joint. In this manner, the sensor means can determine the position of the angle of incidence or the angle of inclination of the torch in a very simple manner, for example, mechanically or electronically on the basis of the position of the ball-and-socket joint.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

In this context, the following is shown, at times schematically.

DETAILED DESCRIPTION

Figure 1:
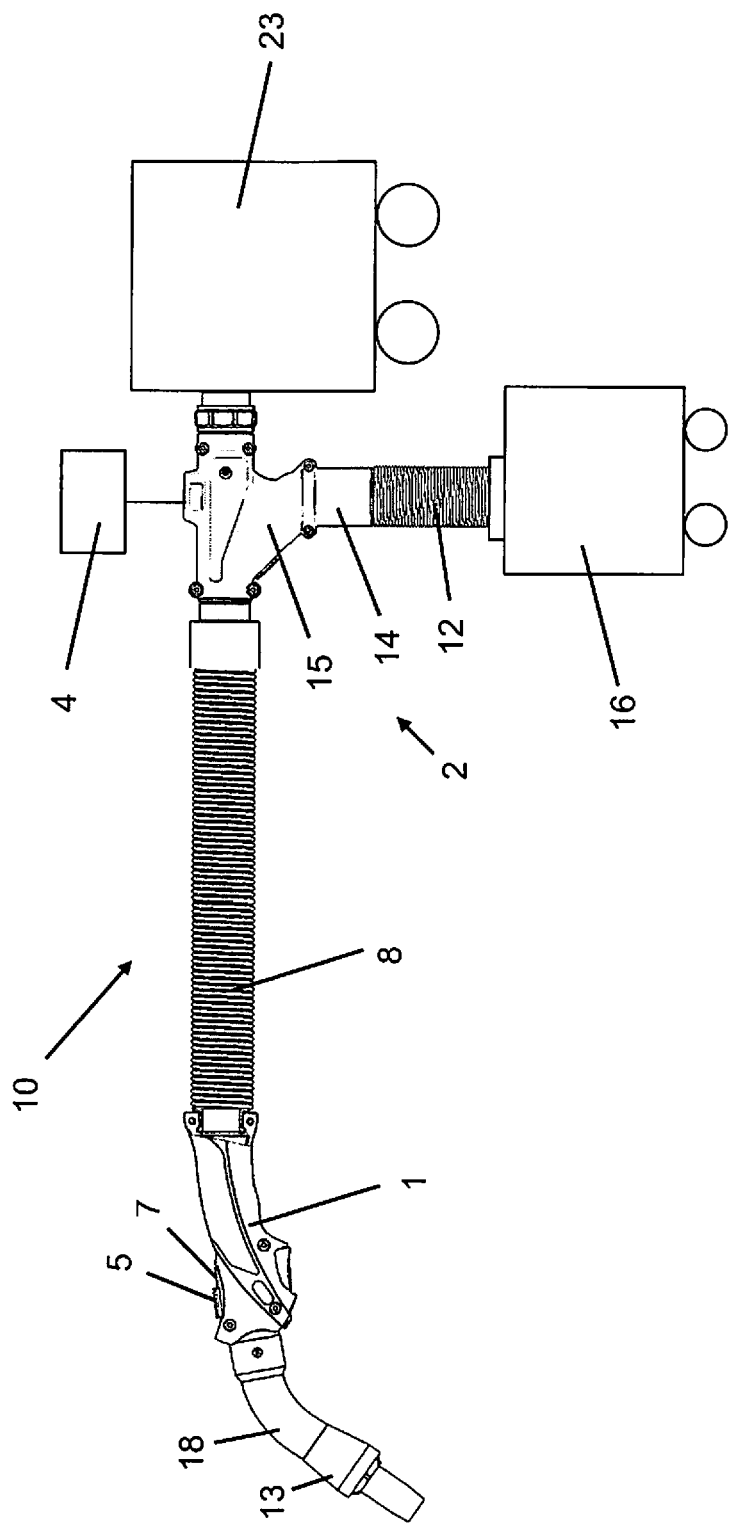
FIG. 1 a device for thermally joining workpieces, comprising a torch with a bypass opening and an extraction unit, FIG. 2 the torch according to FIG. 1 in a torch position with an angle of incidence or an angle of inclination of the torch *a*) in a side view and *b*) in a perspective view, FIG. 3 a torch with an external fume extraction device, FIG. 4 *a*) a connection housing for an extraction hose and *b*) the connection housing with a bypass opening, FIG. 5 a sensor means arranged on the handle of the torch, FIG. 6 a sensor means arranged in a ball-and-socket joint *a*) in a perspective side view and *b*) as a cross sectional depiction, FIG. 7 the connection housing with an aperture, FIG. 8 *a*) the bypass opening and *b*) apertures on an extraction unit, and FIG. 9 a welding robot with a torch.

For the sake of clarity, identical components or those having the same effect are provided with the same reference numerals in the figures of the drawing shown below, making reference to an embodiment.

FIG. 1 shows a device 10 for thermally joining workpieces, comprising a torch 1 and an extraction unit 2 for extracting fumes that are produced during welding, cutting or soldering processes.

Figure 9:
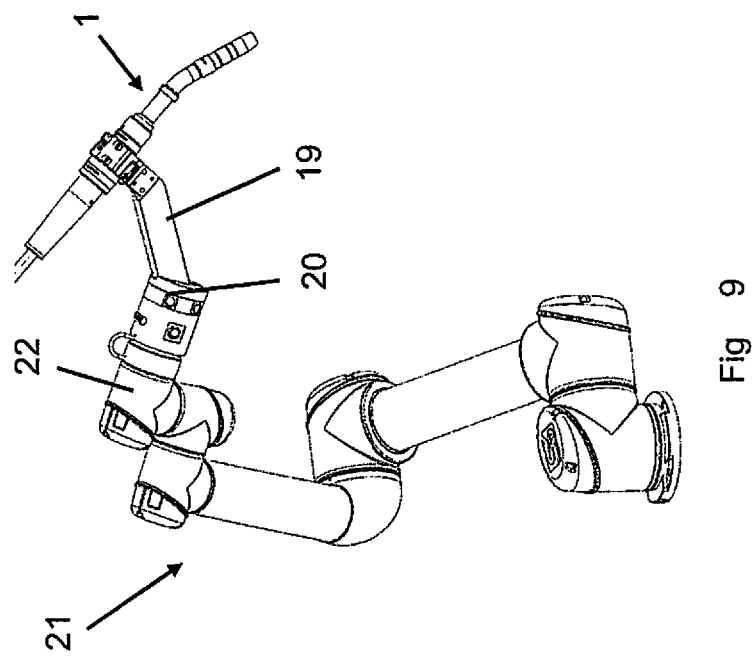

During the work procedure, the torch 1 can be guided by hand or by a handling means, especially by a welding robot 21. Such a welding robot 21 is depicted in FIG. 9. FIGS. 1, 2, 3 and 5 show handheld torches.

The device 10 is well-suited for carrying out different welding processes, for example, beam welding processes, autogenous welding processes or arc welding processes, especially a shielding gas-arc welding process. The device 10 can also be configured as a cutting device for carrying out, for example, a plasma process or a laser cutting process.

FIG. 1 likewise shows an extraction unit 2 that is connected to the torch 1 and it has an extraction hose 8 on the torch side, a connection housing 15 with a connection 14, and an extraction hose 12 on the extraction device side that is guided in an extraction device.

The extraction unit 2 also has an extraction pipe 18 and an extraction nozzle 13.

Figure 3:
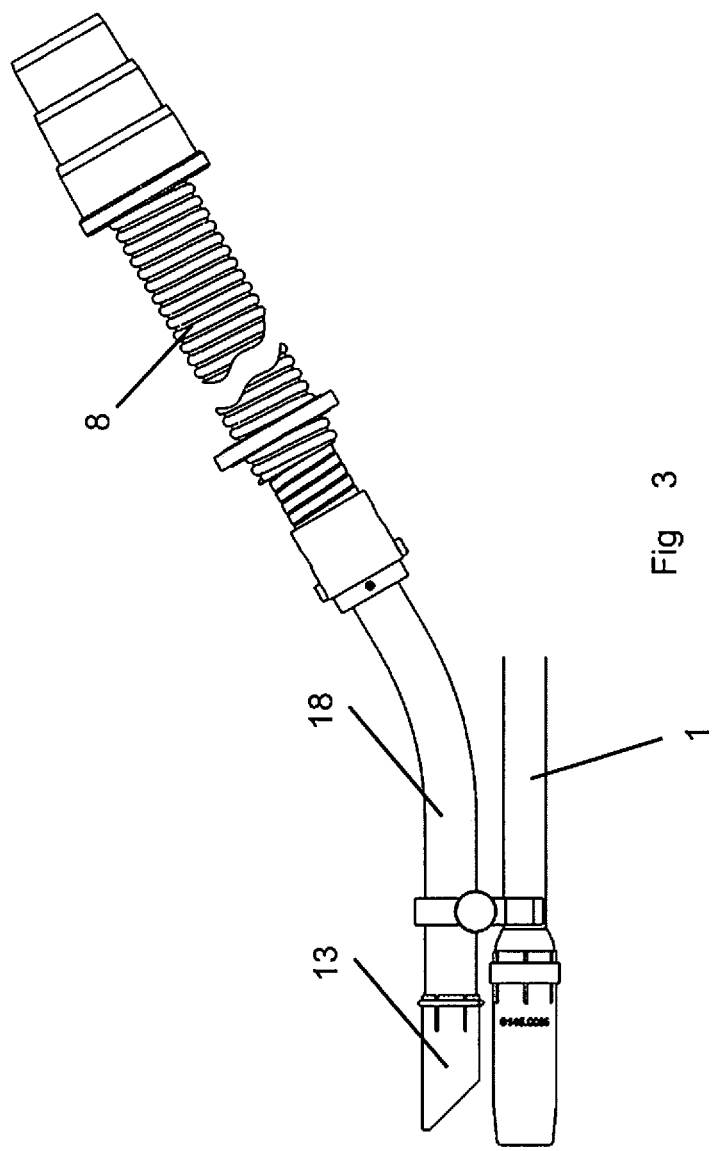

FIG. 3 shows a torch 1 with an extraction unit 2 that is integrated into the torch 1. The extraction hose 8, having the extraction pipe 18 and the extraction nozzle 13, runs separately from the torch 1.

In the embodiments according to FIGS. 1, 2, 5 and 9, the extraction unit 2 is integrated into the torch 1.

Figure 5:
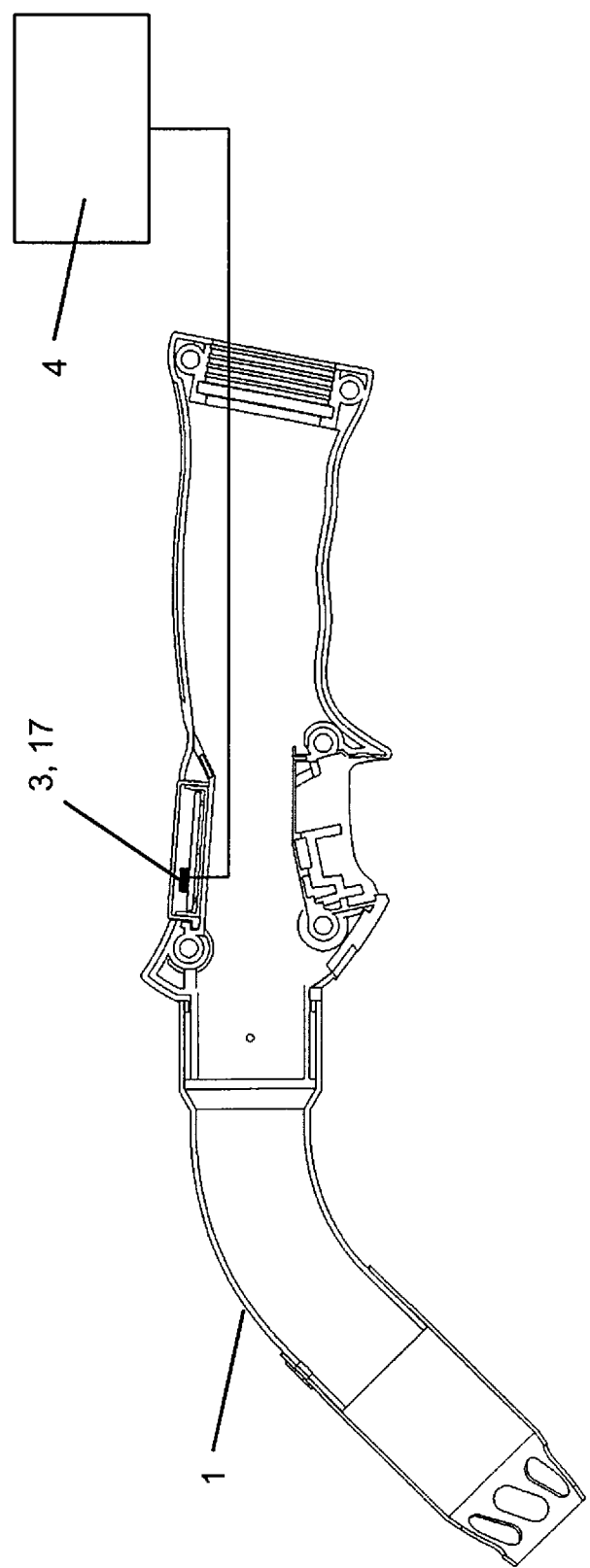
Figure 6:
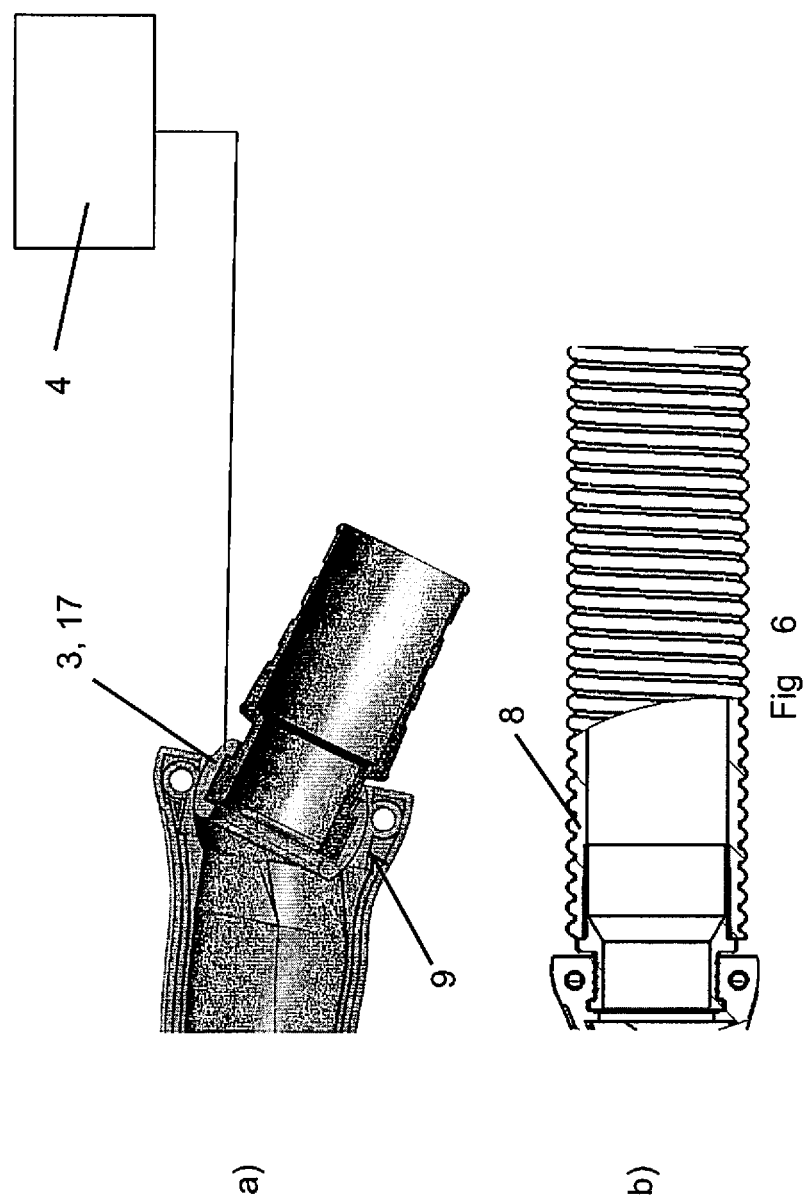

A sensor means 3 shown in FIGS. 5 and 6 for determining the position and/or the changes in the position of the torch 1 and/or a reference point in space relative to a reference position of the torch 1 and/or of the workpiece that is to be processed is provided in such a way that the volume flow of the extraction unit 2 acting at the torch 1, especially at an extraction nozzle 13, is influenced as a function of the determined position and/or the change in the position of the torch 1.

In the present embodiment, the sensor means 3 have at least one sensor 17 for determining a rotation position and/or for determining the rotatory changes in position and/or for determining the translatory change in the position of the torch 1. The sensor means 3 determines the speed and/or the acceleration of a translatory and/or rotatory movement of the torch 1.

For example, in the case of a welding device, the amplitude of the welding current can be influenced as a function of the speed at which, during the creation of a welded connection, the torch moves over the workpieces that are to be welded together.

Here, the sensor means 3 or the sensors 17 can be arranged in, preferably integrated into, the torch 1 or in the connection leading to the extraction hose 8 on the torch side.

The sensor means 3 can be configured as at least an electronically, inductively, capacitively, optically and/or mechanically functioning sensor, especially as an inclination sensor and/or as an acceleration sensor and/or as a gyrosensor.

According to FIG. 5, the sensor means 3 are arranged on the handle of the torch 1. They can be fed via electric connections for the power supply of the torch 1. It is also conceivable for the sensor means 3 to be supplied with electric power by a battery, by an accumulator or by solar cells.

However, the sensor means 3 or the sensors 17 can also be attached to a mechanical torch guide 19 or to an ON-OFF switch 20 or to the arm 22 of the robot 21. The ON-OFF switch 20 is situated between the torch 1 and the robot 21, as shown in FIG. 9.

The control signal for the inclination of the torch 1 can be derived from robot orientation information or from orientation information from welding devices, especially from orbital welding devices of the torch head, so as to thus automatically adjust the volume flow of the extraction unit 2 or the extraction capacity at the extraction nozzle 13.

In the embodiment of the invention according to FIGS. 6 a) and 6 b), the sensor means 3 can be provided with at least one sensor 17, also in the vicinity of an articulation, here a ball-and-socket joint 9. In this context, the ball-and-socket joint 9 is arranged between the torch 1 and the extraction hose 8 on the torch side.

In the present case, the volume flow of the extraction unit 2 is advantageously influenced automatically in terms of its values. For this purpose, a control and/or regulation means 5, 6 is provided that, on the basis of output signals of the sensors 3, 17, detects the position of the torch 1 or the changes in the position of the torch 1, preferably also in three-dimensional space, and it influences the volume flow of the extraction unit 2 in terms of its values as a function of the detected position or the change in position.

FIG. 1 shows such control and/or regulation means 4, 5 that are connected to the at least one sensor means 3 and that serve to control or regulate the volume flow of the extraction unit 2 at the torch 1 as a function of the position and/or the change in the position of the torch 1 determined by the at least one sensor means 3. The reference position of the torch 1 and/or a reference point in space can be selected by the operator and/or by the control and/or regulation means 4, 5.

The control unit 4 determines the extraction capacity as a function of the selected reference position and/or the position and/or the change in position determined by the sensor means 3, and this is done as a function of a characteristic map that can take into account emission-relevant process characteristic variables, especially the current strength, preferably the effective and/or the peak current strength, the welding output and/or the welding speed as well as the wire diameter or the electrode diameter, the filler material and the shielding gas. These process characteristic variables are present as process parameters in the welding current source 23.

As a rule, the quantity of welding fumes being generated rises as the mean current strength or the consumable quantity rises. The same applies to the admixture of active gas components that likewise increase the emissions. In the case of pulsed welding processes, however, the pulse frequency as well as with the pulse current strength result in local emission minima.

In the present embodiment, the extraction capacity is supposed to be increased as the angle of incidence or the angle of inclination 6 of the torch 1 increases, wherein the rise of the characteristic line can be shifted manually, by means of programs, or as a function of the welding process and/or of the type of torch. The angle of incidence or the angle of inclination 6 results here from the forward or backward angle of inclination of the torch in or counter to the advancing direction and from the lateral angle of inclination orthogonally to the advancing direction, as can be seen in FIGS. 2 a) and 2 b).

Here, the volume flow of the extraction unit 2 increases as the angle of incidence or the angle of inclination 6 of the torch increases, preferably continuously.

Figure 2:
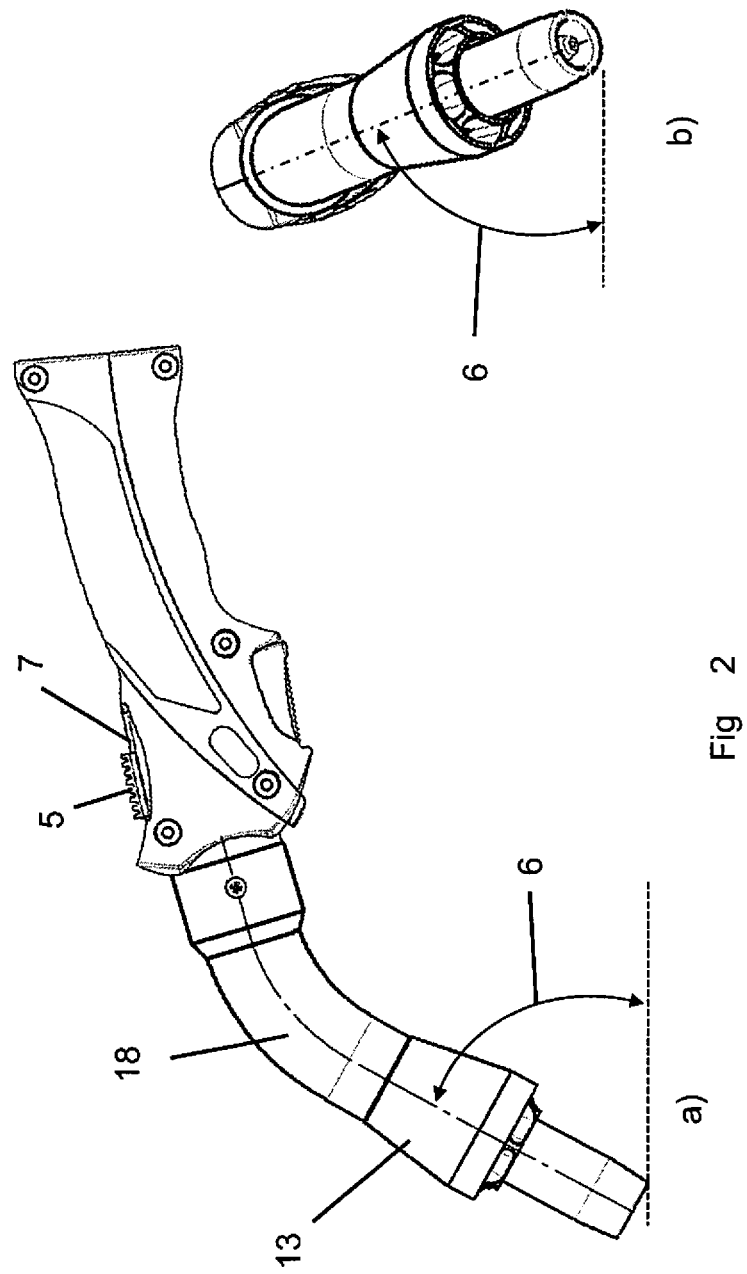

FIGS. 1 and 2 show that the volume flow at the extraction nozzle 13 is regulated by varying at least one bypass opening 7 for the gas flow at the torch 1.

Figure 4:
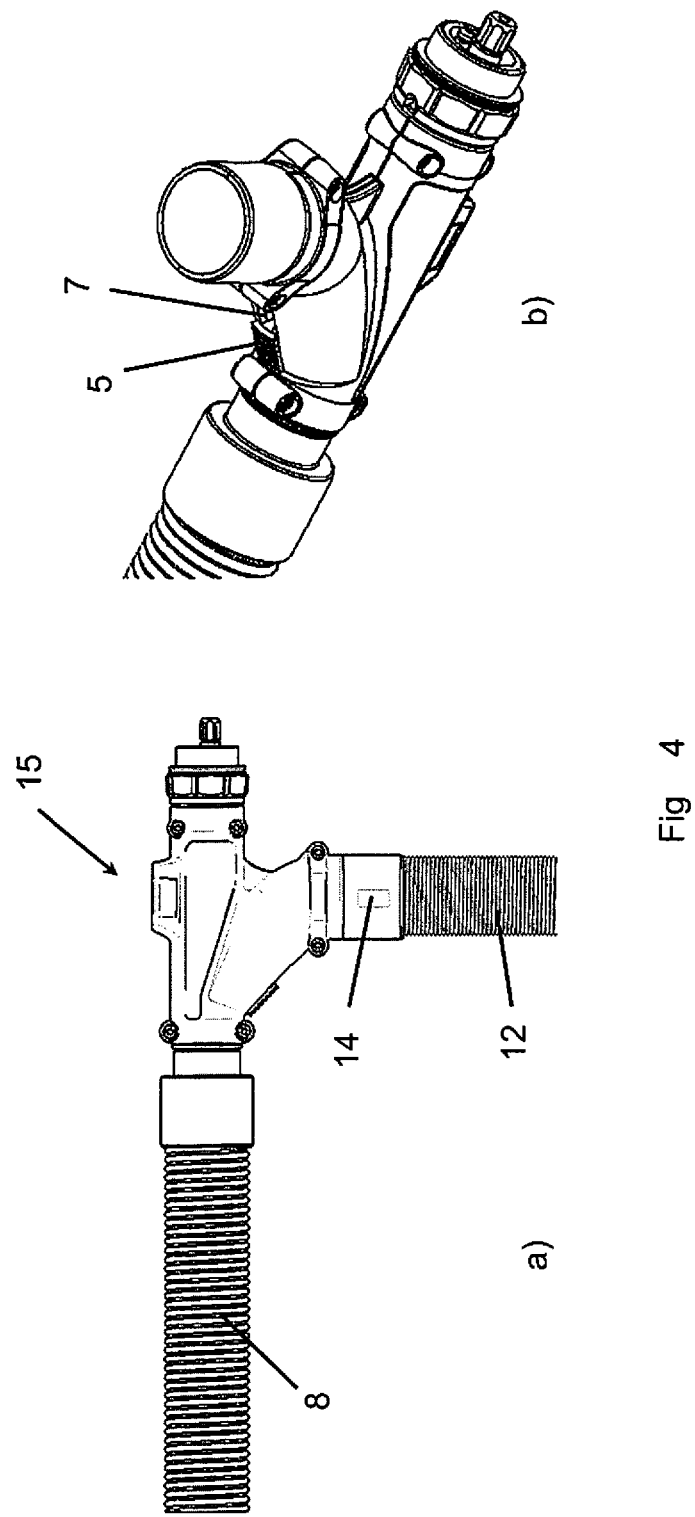

The embodiment according to FIG. 4 a) shows a connection housing 15 for an extraction hose 8 on the torch side and an extraction hose 12 on the extraction device side that has the bypass opening 7 according to FIG. 4 *b*).

Figure 8:
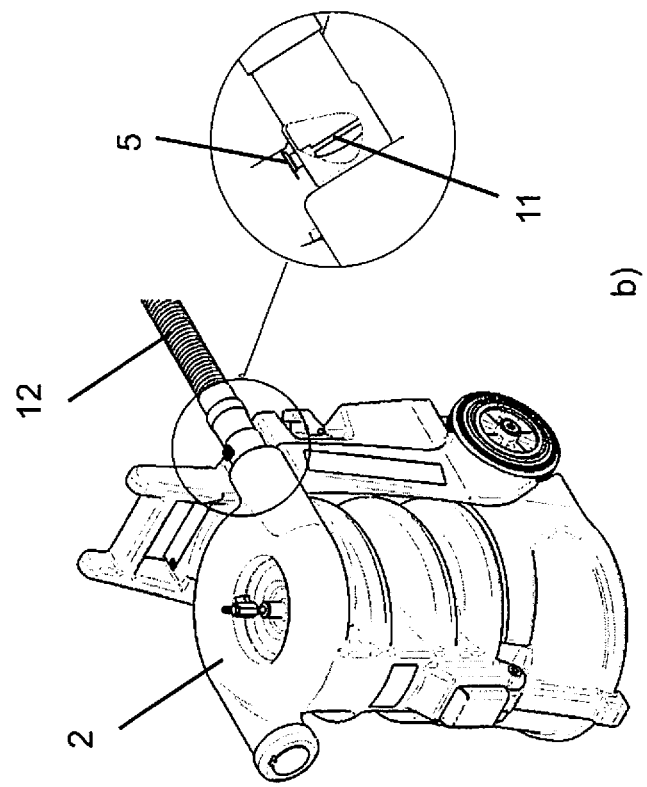
Figure 8:
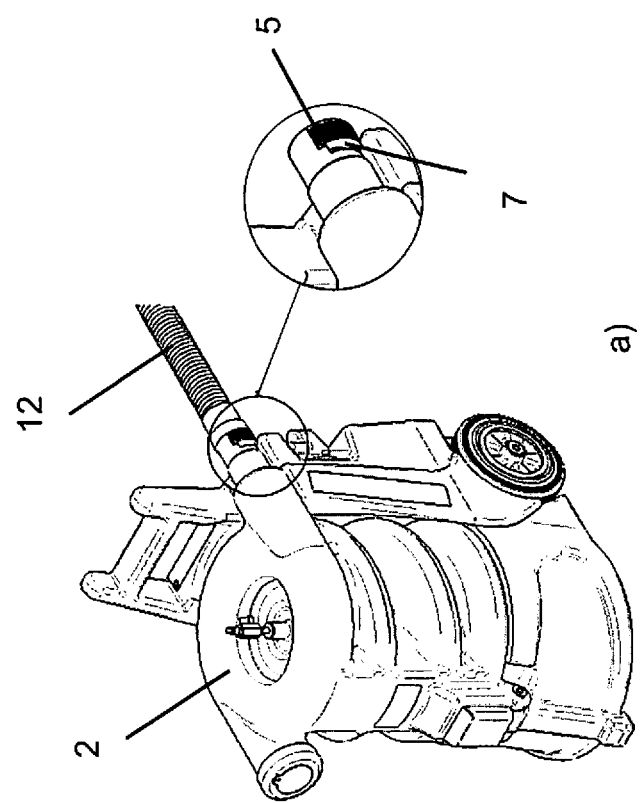

According to FIG. 8 *a*), the bypass opening 7 is arranged on the extraction unit 2. In an embodiment that is not shown here, the bypass opening 7 can be provided on the extraction hose 12 on the extraction device side.

Figure 7:
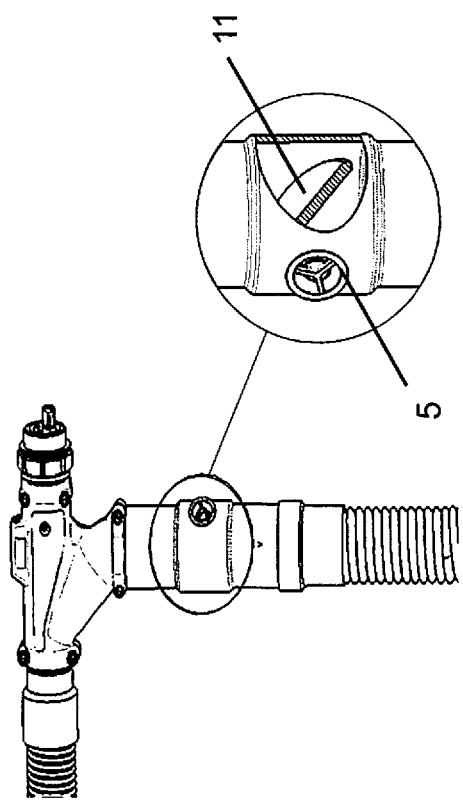

FIG. 7 shows the connection housing 15 for an extraction hose 8 on the torch side with the extraction hose 12 on the extraction device side and with one or more apertures 11 for varying the volume flow at the extraction nozzle 13. According to FIG. 8 *b*), the apertures are provided on the extraction unit 2. In embodiments that are not shown here, the apertures 11 can also be provided on the torch 1 or on the extraction hose 8 on the torch side or on the extraction hose 12 on the extraction device side.

The control signal for the inclination of the torch 1 can be derived from robot orientation information or from orientation information of the torch head.

The device according to the invention can detect changes in the position of the torch 1 during the procedure on one and the same workpiece. It is also possible to detect changes in position in which a different workpiece is being processed after a change in position. For example, if a welding device is carrying out a welding task that relates to a first workpiece, then for example, a changeover to another workpiece can be detected by the sensor means 3 according to the invention and the value of the volume flow can then be adapted to the welding task that is to be carried out on this workpiece.

However, an automatic adjustment of the volume flow of the extraction unit can also be provided on the basis of the output signals of the sensor means 3 after a change in the position of a new workpiece. This is conceivable, for instance, when different workpieces that are physically separated from each other are to be processed in a predetermined sequence.

FIGS. 1, 2, 4 *b*) and 7 *a*) show that the volume flow takes place at the extraction unit 2 by varying at least one bypass opening 7 for the gas flow at the extraction hose 8 of the extraction unit 2 or at a connection 14 on the extraction side or by varying one or more apertures 11 in the extraction flow channel or at the extraction nozzle 13 of the extraction unit 2, preferably at the transition piece of the connection housing 15 of the extraction pipe. The apertures 11 can be configured in the form of throttle valves.

The signal transmission between the sensor means 3 and the control unit 4 of the extraction capacity can take place via cables or wirelessly by means of radio or optical signals.

LIST OF REFERENCE NUMERALS

1 torch
2 extraction unit
3 sensor means
4 control unit
5 regulation means
6 angle of incidence or angle of inclination of the torch
7 bypass opening
8 extraction hose on the torch side
9 articulation
10 device
11 apertures
12 extraction hose on the extraction device side
13 extraction nozzle
14 connection on the extraction device side
15 connection housing
16 extraction device
17 sensor
18 extraction pipe
19 mechanical torch guide
20 ON-OFF switch
21 welding robot
22 arm of the robot
23 welding current source

The invention claimed is:

1. A device (10) for thermally joining workpieces, comprising:
   a torch (1);
   an extraction unit (2) for extracting fumes that are produced during welding, cutting or soldering processes; and
   at least one sensor (3) for determining position and/or changes in the position of the torch (1) and/or of a reference point in space relative to a reference position of the torch (1) and/or of one of the workpieces that is to be processed, wherein the volume flow of extracted fumes is controlled or regulated indirectly by the extraction unit (2) acting at the torch (1) as a function of the determined position of the torch (1) and/or of any one of the changes in the position of the torch (1) determined by the at least one sensor (3).

2. The device (10) according to claim 1, wherein the at least one sensor (3) comprises an array of sensors that includes at least one sensor (17) for determining a rotation position and/or for determining rotatory changes in the position and/or for determining a translatory change in the position of the torch (1).

3. The device (10) according to claim 1, wherein the at least one sensor (3) detects a speed and/or an acceleration of a translatory and/or rotatory movement of the torch (1).

4. The device (10) according to claim 1, wherein, during a work procedure, the torch (1) is configured to be guided by hand or by a welding robot.

5. The device (10) according to claim 1, wherein the device is configured to permit the reference position of the torch (1) and/or the reference point in space to be selected by an operator.

6. The device (10) according to claim 1, wherein, as a function of the selected reference point and/or on the position determined by the at least one sensor (3) and/or on the change in position of the torch (1), extraction capacity of the extraction unit (2) is determined as a function of a characteristic map that comprises emission-relevant process characteristic variables that are present as process parameters in a welding current source (23) selected from the group consisting of current strength, effective current strength, peak current strength, welding output, welding speed, wire diameter, electrode diameter, filler material and type of shielding gas, and combinations of such process parameters.

7. The device (10) according to claim 1, wherein the volume flow of the extraction unit (2) increases as an angle of incidence or an angle of inclination (6) of the torch increases.

8. The device (10) according to claim 1, wherein the extraction unit (2) has an extraction nozzle (13), and the volume flow takes place at the extraction nozzle (13) by varying at least one bypass opening (7) for the gas flow at the torch (1) or at an extraction hose (8) on a torch side or at an extraction hose (12) on an extraction device side or at a connection housing (15) or at the extraction unit (2) or by varying one or more apertures (11) at the torch (1) or at the extraction hose (8) on the torch side or at the extraction hose (8) on the extraction device side or at the connection housing (15) or at the extraction unit (2).

9. The device (10) according to claim 8, wherein the at least one sensor (3) is arranged in or integrated into the torch (1) or in the connection leading to the extraction hose (8) on the torch side.

10. The device (10) according to claim 8, wherein the torch (1) and the extraction hose (8) on the torch side are operatively connected via an articulation or a ball-and-socket joint (9), wherein the at least one sensor (3) is arranged in the vicinity of the ball-and-socket joint (9).

11. The device (10) according to claim 1, wherein the at least one sensor (3) is configured as at least an electronically, inductively, capacitively, optically and/or mechanically functioning sensor, or as an inclination sensor or as a gyrosensor.

12. The device (10) according to claim 1, wherein the at least one sensor (3) is secured to a welder's hand, to a mechanical torch guide (19), to an ON-OFF switch (20), or to an arm (22) of a welding robot (21).

13. The device (10) according to claim 1, wherein the torch (1) is within an orbital welding device having a torch head, and wherein a control signal for inclining an angle of the torch (1) is derived from robot orientation information of the torch head.

14. The device (10) according to claim 1, wherein signal transmission from the at least one sensor (3) indicative of the extraction capacity of the extraction unit (2) takes place via cables or wirelessly by means of radio or optical signals.

* * * * *